(12) United States Patent
Rathnavelu et al.

(10) Patent No.: US 10,621,237 B1
(45) Date of Patent: Apr. 14, 2020

(54) CONTEXTUAL OVERLAY FOR DOCUMENTS

(71) Applicant: Amazon Technologies, Inc., Reno, NV (US)

(72) Inventors: Kadirvelu Rathnavelu, Seattle, WA (US); Zach Barbitta, New York, NY (US)

(73) Assignee: AMAZON TECHNOLOGIES, INC., Seattle, WA (US)

(*) Notice: Subject to any disclaimer, the term of this patent is extended or adjusted under 35 U.S.C. 154(b) by 681 days.

(21) Appl. No.: 15/225,529

(22) Filed: Aug. 1, 2016

(51) Int. Cl.
*G06F 16/00* (2019.01)
*G06F 16/93* (2019.01)
*G06F 17/21* (2006.01)
*G06K 9/18* (2006.01)
*G06F 16/31* (2019.01)
*G06F 16/338* (2019.01)
*G06F 16/951* (2019.01)

(52) U.S. Cl.
CPC ............ *G06F 16/93* (2019.01); *G06F 16/316* (2019.01); *G06F 16/338* (2019.01); *G06F 16/951* (2019.01); *G06F 17/212* (2013.01); *G06K 9/18* (2013.01)

(58) Field of Classification Search
CPC ...... G06F 16/93; G06F 16/316; G06F 16/338; G06F 16/951; G06F 17/212; G06F 17/30011; G06F 17/30696; G06F 17/30864; G06K 9/18
USPC ........................................................ 707/722
See application file for complete search history.

(56) References Cited

U.S. PATENT DOCUMENTS

| | | | | |
|---|---|---|---|---|
| 7,765,206 B2* | 7/2010 | Hillis | ................ | G06Q 30/0601 707/723 |
| 7,797,635 B1* | 9/2010 | Denise | ................ | G06F 16/9038 715/738 |
| 8,239,377 B2* | 8/2012 | Milic-Frayling | ... | G06F 16/9535 707/722 |
| 8,719,713 B2* | 5/2014 | Esposito | ................ | G06Q 30/02 715/760 |
| 9,037,561 B2* | 5/2015 | Oliver | ............... | G06F 16/24578 707/705 |
| 9,298,712 B2* | 3/2016 | Velagapudi | ............. | G06F 16/43 |
| 9,690,831 B2* | 6/2017 | Isaacs | ................... | G06F 16/332 |
| 9,798,708 B1* | 10/2017 | Sharifi | ................. | G06F 16/156 |
| 2004/0090462 A1* | 5/2004 | Graham | ................. | G06F 16/40 715/767 |
| 2004/0194021 A1* | 9/2004 | Marshall | ............... | G06F 17/241 715/232 |

(Continued)

*Primary Examiner* — Thanh-Ha Dang
(74) *Attorney, Agent, or Firm* — Hogan Lovells US LLP

(57) ABSTRACT

Approaches provide for analyzing document data to provide contextual overlays. For example, an application executing on a computing device (or at least in communication with the computing device) can analyze document data to determine a set of keywords based on features extracted from the document data. The keywords can be used to query an index of websites based on a relevance function in order to determine websites that are most relevant to the text identified from the document, at least some of which can be analyzed using a search engine to identify contextual information in the websites associated with the document. Thereafter, the contextual information can be provided for display with the document.

20 Claims, 10 Drawing Sheets

(56) References Cited

U.S. PATENT DOCUMENTS

| | | | | |
|---|---|---|---|---|
| 2006/0119900 A1* | 6/2006 | King | | H04N 1/00244 358/462 |
| 2007/0124298 A1* | 5/2007 | Agrawal | | G06F 16/438 |
| 2009/0216735 A1* | 8/2009 | Dexter | | G06F 16/93 |
| 2009/0217159 A1* | 8/2009 | Dexter | | G06F 17/24 715/271 |
| 2009/0228442 A1* | 9/2009 | Adams | | G06F 16/951 |
| 2009/0228811 A1* | 9/2009 | Adams | | G06F 16/338 715/760 |
| 2009/0228817 A1* | 9/2009 | Adams | | G06F 16/338 715/767 |
| 2010/0145927 A1* | 6/2010 | Kasbekar | | G06F 16/3326 707/710 |
| 2010/0223257 A1* | 9/2010 | Milic-Frayling | | G06F 16/9535 707/722 |
| 2010/0325542 A1* | 12/2010 | Esposito | | G06Q 30/02 715/716 |
| 2011/0119262 A1* | 5/2011 | Dexter | | G06F 16/951 707/726 |
| 2011/0137933 A1* | 6/2011 | Pelenur | | G06F 16/9577 707/769 |
| 2012/0158713 A1* | 6/2012 | Jin | | G06F 16/435 707/728 |
| 2012/0278341 A1* | 11/2012 | ogilvy | | G06F 16/313 707/749 |
| 2012/0314082 A1* | 12/2012 | Bezine | | G06Q 10/10 348/161 |
| 2013/0159826 A1* | 6/2013 | Mason | | G06F 17/2247 715/205 |
| 2014/0201652 A1* | 7/2014 | Esposito | | G06Q 30/02 715/760 |
| 2014/0317104 A1* | 10/2014 | Isaacs | | G06F 16/332 707/728 |
| 2014/0324819 A1* | 10/2014 | Risvik | | G06F 16/182 707/711 |
| 2015/0178349 A1* | 6/2015 | Niewodniczanski | | G06F 16/245 707/722 |
| 2016/0125038 A1* | 5/2016 | Heinbockel | | G06F 16/2458 707/730 |
| 2017/0293622 A1* | 10/2017 | Miller | | G06F 16/248 |

* cited by examiner

CONTEXTUAL OVERLAY FOR DOCUMENTS

BACKGROUND

Users are increasingly utilizing electronic devices to obtain various types of information. For example, a user wanting to locate information related to a document, such as a user manual, product manual, or other such document might utilize a search engine in order to attempt to locate the type of information in which the user is interested. However, unless the user knows exactly what they are looking for, and how to enter a search to obtain such information, the user might have to search through numerous websites using various options to attempt to locate the type of information in which the user is interested. If the user is interested in specific information, the user might have no option but to sift through these results. Further, it can be cumbersome to determine a search query that returns results in which the user is interested and to refine those results. The process can be time consuming and potentially frustrating for a user, which can result in the user not locating the type of information in which the user is interested.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure overcome one or more of the above-referenced and other deficiencies in conventional approaches to providing users with information via a computing device. In particular, various embodiments provide for analyzing document data to recognize text in the document data. The recognized text can be used to determine a set of keywords, and the set of keywords can be used to determine a set of websites that include contextual information associated with the document data. As the user views the document, or submits a search, relevant contextual information can be provided for display with the document.

For example, a document stored locally or remote a user's computing device can be uploaded to a file storage service or other such service. The document can be, for example, a user manual, a product manual, a scholarly paper, a product listing, a financial report, a receipt, an instruction manual, a digital book, a financial document, etc. An application executing on the computing device (or at least in communication with the computing device) can analyze the document to determine a set of keywords based on features extracted from the document. As will be described further herein, the document can be analyzed using different techniques, such as an optical character recognition (OCR) technique, an object recognition technique, a logo recognition technique, a bar code recognition technique, among other such techniques. The keywords can be used to query an index of websites based on a relevance function in order to determine websites that are most relevant to the keywords identified in the document, at least some of which can be analyzed using a search engine to identify contextual information in the websites associated with the document. Thereafter, the contextual information can be provided for display with the document. For example, the contextual information can be displayed in a viewing pane, a pop-up, an overlay, among other such options along with the document. Upon receiving, from a user, a touch (or other) selection of the contextual information, additional information for the selected contextual information can be displayed, enabling the user to quickly learn more about content in the document.

Various other functions and advantages are described and suggested below as may be provided in accordance with the various embodiments.

Figure 1A:
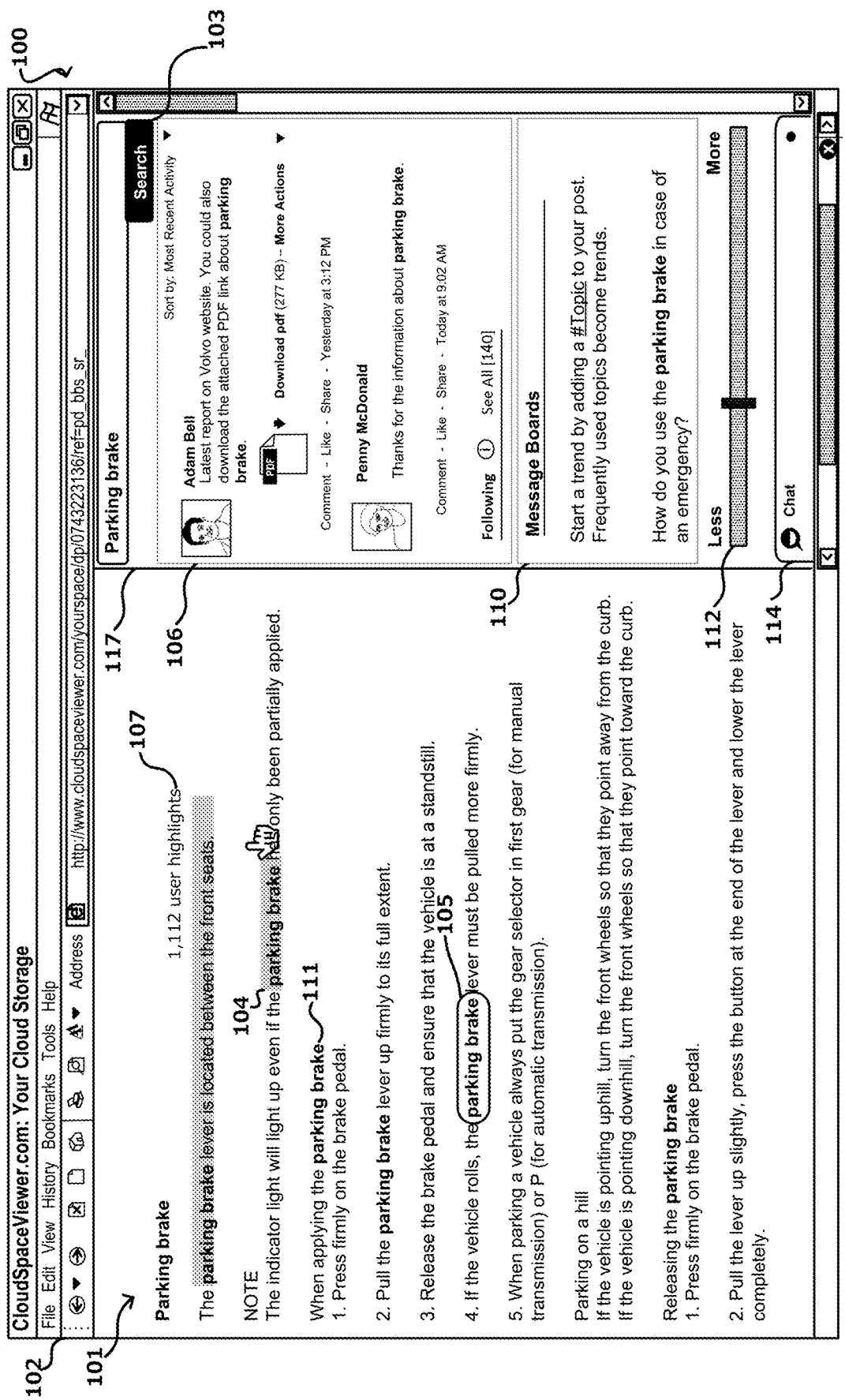
FIGS. 1A, 1B, 1C, and 1D illustrate examples of displaying relevant contextual information associated with a document in accordance with various embodiments.

FIG. 1A illustrates an example situation 100 of displaying contextual information with a document. In this example, a document stored locally or remote the user's computing device can be uploaded to a file storage service or other such service. The document can be, for example, a user manual, a product manual, a scholarly paper, a product listing, a financial report, a receipt, an instruction manual, a digital book, etc. As shown, a user is using a web browser 102 to view document 101 (e.g., a product manual). It should be noted that although in this example a web browser is used to view the document, in accordance with various, an application executing on a computing, or any document viewer can be used to view the document.

In this example, document 101 is a product manual. An application executing on the computing device or at least in communication with the computing device can analyze document 101 to determine relevant portions of the document and the relevant portions of the document can be associated with contextual information. It should be noted that in various embodiments the document may have been previously analyzed. For example, a user may have previously uploaded the document, which could have triggered analysis of the document or the process may have been automatically been performed. In these situations, the previously determined relevant portions of the document can be reused and the process of analyzing the document does not have to be repeated. In the situation where the document is being analyzed for a first time, the process can continue as described herein. Contextual information can include information relevant to an understanding of the document, such as the identity of things named in the document, information about things named in the document, interpretive information, and other such information. Contextual information can be obtained from social networks, message boards, forums, blog or personal websites, business websites, ecommerce websites, business directory websites, job board websites, question and answer websites, nonprofit and religion websites, portfolio websites, online community websites, auction websites, knowledgebase/wiki websites, podcasting websites, school or college websites, periodical websites among other such website.

In accordance with various embodiments, analyzing the document can include using optical character recognition (OCR) techniques, object recognition techniques, logo recognition techniques, bar code recognition techniques, among other such techniques, to determine a set of keywords based on features extracted from document 101. The keywords can be used to identify websites that may include contextual information associated with the document. The keywords can be associated with a confidence value. The confidence value can be a score representing a confidence that the keyword was correctly identified. The confidence score can be determined by the process used to identify respective keywords. The keywords can be used to generate a set of ranked websites. For example, the keywords can be used to query an index of websites to return a list of candidate websites. The candidate list of websites can go through a relevance ranking process in order to determine as well as rank websites that are most relevant to the keywords identified from the document. As will be described further herein, the relevance function can consider the confidence of the recognition of each keyword, the ordering of keywords, among other such factors.

Once the contextual information is determined, relevant contextual information can be displayed with the document in response to a user query. For example, a user can overlay a search field 103 on the interface that displays the document. In other embodiments, the search field is already displayed on the interface. The user can enter search terms in the search field, and in response to submitting a search, websites with the highest relevancy score can be analyzed by a search engine to retrieve contextual information associated with the document and the search query. Thereafter, the most relevant contextual information as it pertains to the document can be displayed. As shown, relevant social media 106 and information from a message board 110 are displayed in a viewing pane 117 to the right of the document. The social media and message boards can include user comments and other relevant contextual information as it pertains to the document and search terms.

In accordance with various embodiments, the contextual information can be sorted by most recent activity, the type of contextual information (e.g., social media, message boards, forums, etc.), the relevancy of the contextual information, among other such considerations. The interface can include graphical controls and/or preferences to control the type of contextual information displayed. This can include graphical buttons to control the type of contextual information displayed, where selecting and/or deselecting a graphical button can control whether the type of contextual information associated with the graphical button is displayed. Other graphical controls include a slide bar 112 to control the amount of contextual information displayed, where moving the slide bar affects the number of types of contextual information displayed. For example, moving the slide bar to the left might result in displaying only contextual information associated with social media. Moving the slide bar to a middle position might result in displaying contextual information associated with social media and message boards. Moving the slide bar to the right might attempt to display all available contextual information. In certain embodiments, the contextual information displayed and/or at least ranked to potentially be displayed can be based on information in a user profile and/or user account. The information can indicate a user's preference to the source (e.g., the website hosting the information) and/or type of contextual information. A messaging application 114 can be provided. The messaging application can be used to chat with other users, for example, users of the document viewing service or users reviewing the document and/or a similar document. For example, if the user is viewing a product manual for a particular type of car, the messaging application can include users viewing the same product manual, product manuals for any type of car, product or other documentation for any type of car, bus, motorcycle, etc.

In accordance with various embodiments, information (e.g., keywords) in the document considered relevant can be emphasized. The relevant information can be related to the search or otherwise determined to be relevant, as may include the keywords. Emphasizing the relevant information can include highlighting portions of the document, displaying a visual cue next to portions of the document, bolding portions of the document, outlining portions of the document, among other such techniques used to emphasize content as is known in the art. As shown in FIG. 1A, emphasis includes highlighting content 104, outlining content 105, bolding content 111, and displaying a visual cue 107 near content.

Figure 1B:
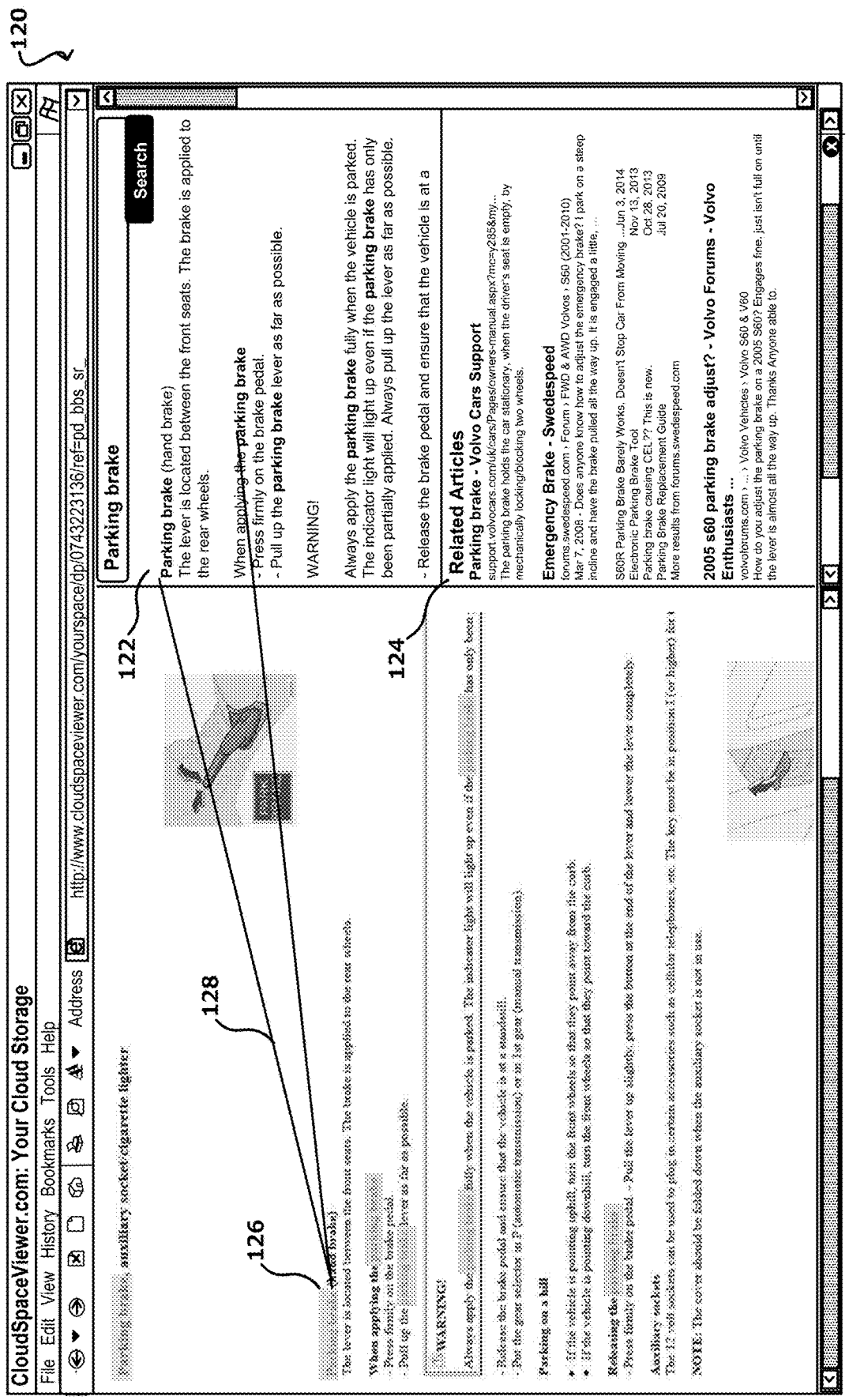

Example 120 of FIG. 1B illustrates another example of displaying relevant contextual information in accordance with various embodiments. In this example, a user has searched for information related to a parking brake. In response to the search, contextual information can be displayed. In this example, the contextual information includes portions 122 of the document related to the search terms "parking brake" in one panel of the viewing pane and related articles 124 in another panel of the viewing pane. A graphical element 128 that shows a mapping between the contextual information in the viewing pane and the related portion 126 in the document can be displayed. In various embodiments, the mapping can include the mapping between keywords in the document and other contextual information, such as any one of the related articles. Additionally, in accordance with various embodiments, the user can select one of the articles and, in response to selecting an article; a viewing window can be launched to view the selected article. The viewing window can include a new web browser window, a pop-up window, an overlay, etc.

Figure 1C:
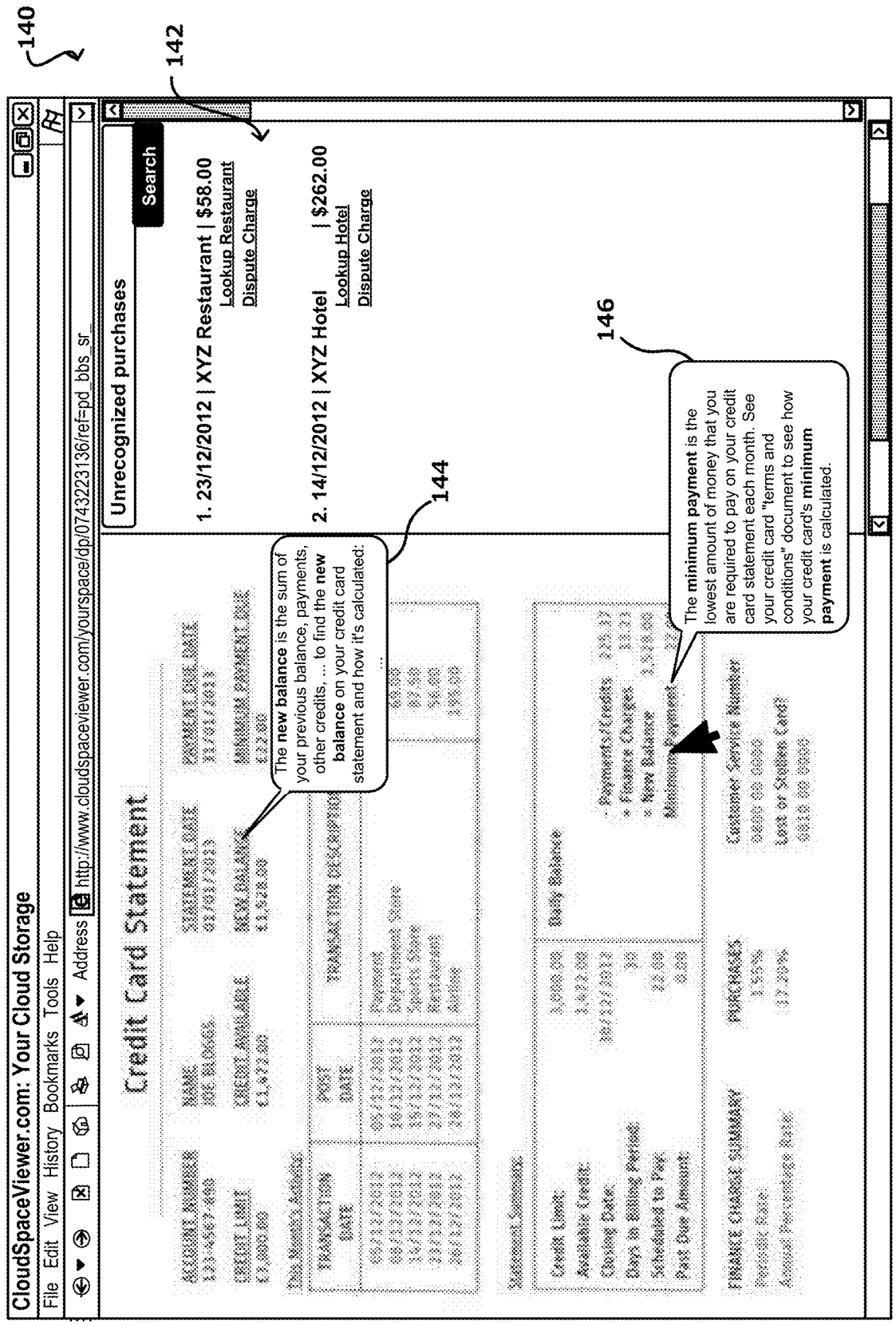

Example 140 of FIG. 1C illustrates another example of displaying relevant contextual information. In this example, the document is a financial statement. The user can enter search terms in a search field, and in response to submitting a search for, e.g., unrecognized purchases, a list of unrecognized purchases 142 can be displayed in the viewing pane. Other example searches include most expensive purchase, pending purchases, lest expensive purchase, etc. A number of helpful links can be provided with the results. For example, in the situation where the user searches for unrecognized purchases, a link to lookup the vendor of the unrecognized purchase can be provided, a link to dispute the charge of the unrecognized purchase can be provided, among other such links. In accordance with various embodiments, a pop-up or other such overlay can be used to provide for display additional contextual information. The additional information can include definitions, links to documents or websites, quick links associated with the document, or any other type of information. In this example, the pop-up can display contextual information associated with terms in the financial document. As shown in FIG. 1C, pop-up 144 includes information describing the term "new balance" and pop-up 146 includes information describing the term "minimum payment." Other pop-ups can be provided to describe other portions of the financial document. For example, as the user selects content on the document, contextual information for the selected content can be displayed in a pop-up. In accordance with various embodiments, the pop-ups can be provided in other documents such as those described herein. The pop-ups can be positioned anywhere on the page, hidden, resized, placed in a fixed position, etc.

Figure 1D:
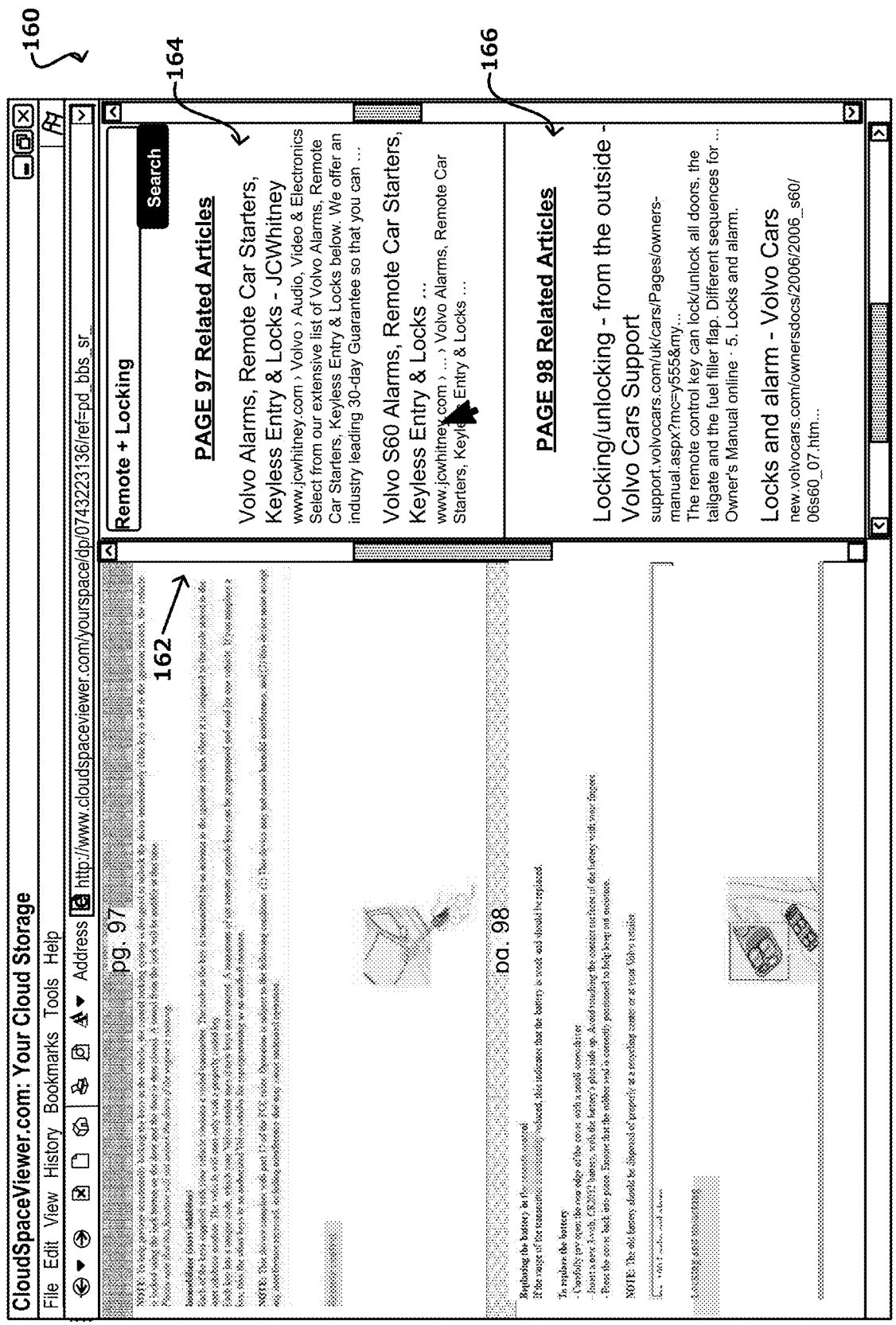

Example 160 of FIG. 1D illustrates another example of displaying relevant contextual information. In this example, the document is an instruction manual. The user can enter search terms in a search field, scroll the document, etc., to find and view information. In this example, in response to submitting a search for "Remote+Locking," contextual information associated with the search is displayed in the viewing pane 162. As the user scrolls through the document, the contextual information displayed in the viewing pane is updated. For example, in FIG. 1D, a user is scrolling an instruction manual and as the user scrolls the document from, for example, page 98 to page 98, contextual information can be displayed in the in the viewing pane for the current pages being viewed. For example, in the situation where the user is viewing page 98, the viewing pane can include contextual information that is associated with the content on page 98 of the document. In the situation where the user is viewing page 98, the viewing pane can include contextual information that is associated with the content on page 98. In the situation where the user is scrolling between pages 98 and 98, the viewing pane can include contextual information that is associated with the content on pages 98 and 98. For example, page 98 includes content relating to a remote and the viewing pane can include a list of articles 164 relating to page 98 and user's search ("Remote+Locking.) Page 98 includes content relating to locking, and the viewing pane can include a list of articles 166 relating to page 98 and user's search. As shown, the user is viewing both page 98 and page 98, and the viewing pane includes contextual information associated with both pages. Accordingly as the user goes from viewing one page to the next, the contextual information that is displayed can be updated accordingly.

Figure 2:
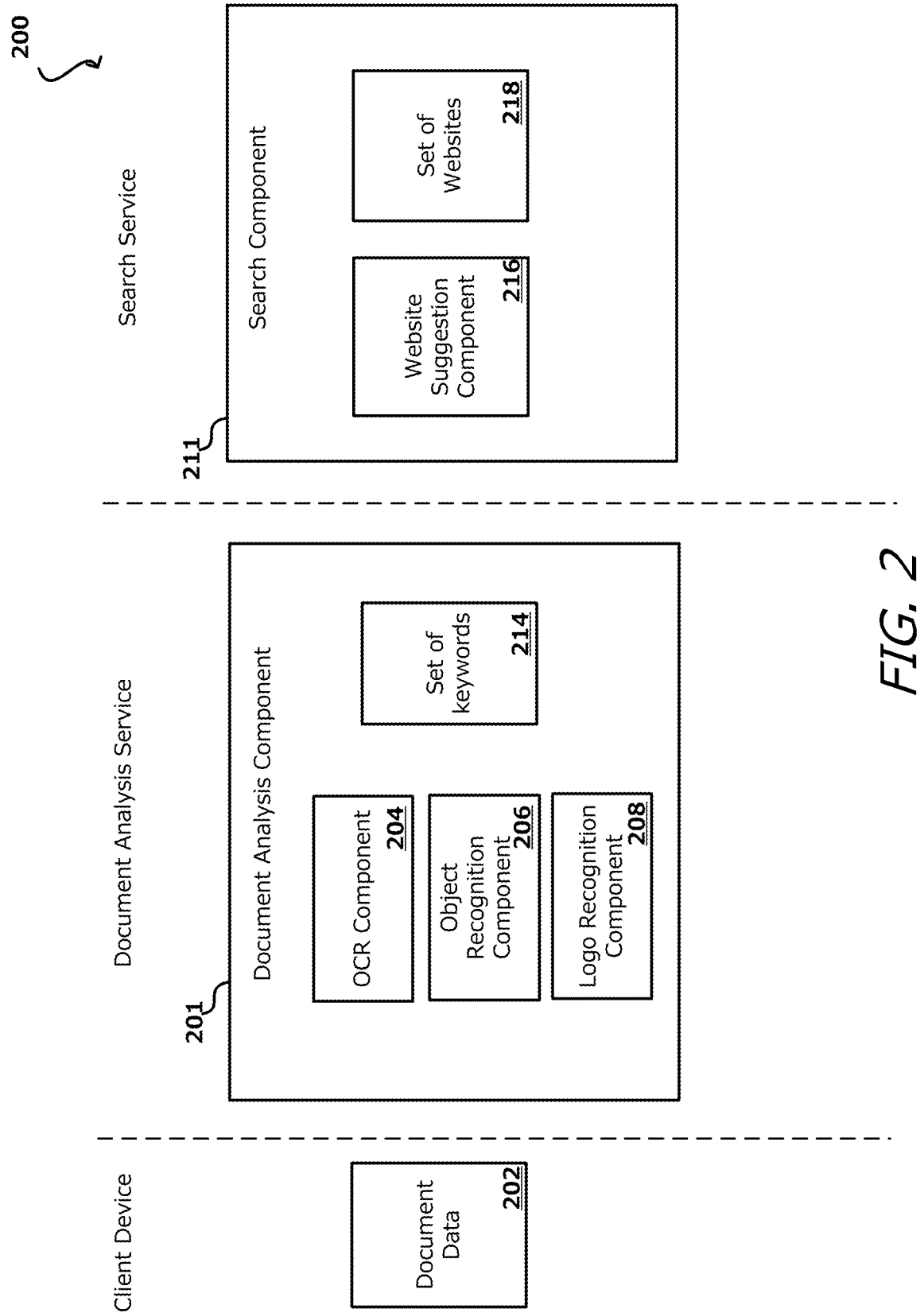
FIG. 2 illustrates an example data flow through a system in accordance with an embodiment.

FIG. 2 illustrates an example data flow 200 through a system in accordance with various embodiments. In this example, a user has uploaded a document to a remote server. The document can include, for example, an instruction manual, a product manual, an electronic book, an electronic magazine, an electronic article, a financial statement, among other documents. The document can be uploaded to a file hosting service, a content provider, or other such provider. In certain embodiments the document is analyzed on locally on the user's computing device.

The document can include different types of content, such as text, images, bar codes, etc. The document can be analyzed using software or a set of software components. The software components can include an optical character recognition (OCR) component 204 to recognize words in the document, an object recognition component 206 to determine words (e.g., tags, labels, etc.) describing an item(s) represented in the document, and a logo recognition component 208 to recognize brand logos represented in the document. It should be noted that the subject application also relates to the utilization of other computer vision techniques such as image match, deep learning, human recognition, poselet analysis, scene understanding, for example, to analyze documents to determine relevant information in those documents.

The OCR component 204 can implement an OCR process. In this example, the document 202 is received at the document analysis component 201. The OCR component recognizes words represented in the document. In at least one embodiment, the recognized words can be ranked according to respective confidence values. The object recognition component 206 can be configured to recognize an item represented in the document and can generate labels that correspond to an item category of the item represented in the document. Example item categories include math formulas, vehicles, people, animals, warning labels, recommendation labels, etc. Example labels include words describing the item or category of the item represented in the document. The logo recognition component 208 can be configured to extract features of logos represented in the document and can recognize the logo, as may include determining a brand, company, organization, service, etc. associated with the logo.

In accordance with various embodiments, any number of algorithms can be used to implement an OCR process, an object recognition process, or a logo recognition process. One such example includes a neural network-based approach. In this approach, a neural network can be used to train a first classifier algorithm to recognize words, a second classifier algorithm to determine an object label, and a third classifier algorithm to recognize logos and other markings. The first classifier can be a convolutional neural network (CNN) trained on a data set of words. The first classifier can be used to analyze the document to generate a classification vector that includes an entry (i.e., a probability) for each of the words the first classifier is trained to recognize. The second classifier can be a CNN trained on a data set that includes item categories to determine an item category of an item represented in the document. For example, the second classifier algorithm can be configured to analyze the document to generate a feature vector, categorization value, weighting, or other score that indicates a probability that the document includes an instance of a certain category. The feature vector can include an entry (i.e., a probability) for each of the categories the second classification algorithm is trained to recognize. The probabilities can be utilized to generate a probability distribution of output category data, where the, for example, highest probability can be selected to determine a category of the item represented in document. In certain embodiments, the second classifier can be a recurrent neural network (RNN) trained on a data set that includes images and descriptions of the respective images to recognize descriptions those images. The RNN then can use a predicted feature vector to begin generating words in an attempt to output an appropriate word or sequence of words to describe the item represented in the document. Each module in the RNN can be a replicated neural network, and each previously generated word can be used to generate a next word. The document and the previous word are used as inputs to the RNN, which then predicts the next word. RNNs can generate words or characters one at a time to predict string descriptions of an item represented in the document, for example. RNNs can be capable of determining which parts of a document are more discriminative for a given category and can learn which parts of a document on which to focus to predict each of the words in a caption or other description sequence, such as a search string sequence.

The document analysis component 201 generates a set of keywords 214 that include words corresponding to the recognized text from the OCR component 204, the labels from the object recognition component 206, and words, descriptors, and other information corresponding to a logo, brand, etc. from the logo recognition component 208. Each keyword can be associated with a confidence value as determined from the component that determined the keyword. A search component 211 that includes a website suggestion component 216 can receive the keywords and can query an index of websites based on a relevance function in order to determine websites 218 that are most relevant to the keywords identified in the document, at least some of which can be analyzed using a search engine to identify contextual information in the websites associated with the document. In accordance with an embodiment, the index can include formation from various websites. The websites can include social networks, message boards, forums, blog or personal websites, business websites, ecommerce websites, business directory websites, job board websites, question and answer websites, nonprofit and religion websites, portfolio websites, online community websites, auction websites, knowledgebase/wiki websites, podcasting websites, school or college websites, periodical websites among other such websites. A software application can analyze the websites and can index the content of the websites or of the internet as a whole. In one example, the software application can assign keywords or phrases to web pages or websites within a metadata tag (or "meta-tag") field, so that the web page or website can be retrieved with a search engine that is customized to search the keywords field. It should be noted that web indexing, search engine indexing, and other such indexing techniques may be implemented as are familiar to those skilled in the art.

In accordance with an embodiment, querying the index using the relevance function can include first identifying websites that include a word of the set of keywords to determine a set of candidate websites that include contextual information. For example, in the situation where the set of words includes "car alarm," the website suggestion component can query the index to identify websites including the words "car alarm." The website suggestion component can determine a relevance score for each candidate website based on a number of keywords from the set of keywords included in a respective candidate website, a confidence value associated with each of the keywords, and other such factors. Thereafter, the website suggestion component can rank the candidate websites based on respective relevance scores.

In accordance with various embodiments, the website suggestion component can refine the list of candidate websites in a post processing process. For example, in various embodiments, it is unlikely that words from the set of keywords will be the only words in the candidate websites. For example, if the keywords include "car remote control," the candidate websites might include "TV remote control." The additional words (i.e., "TV") are not one of the keywords. Accordingly, to refine the set of websites, the candidate websites can be restricted to only contain keywords and stop words such as an, the, and, has, but, etc. In addition, many candidate websites include words in a different order, such as "remote car control," where the ordering of the words may impact the relevancy of the candidate websites. Thus, in addition to considering all the recognized keywords as in the first refining step, the relative ordering of those keywords can be considered as well. Accordingly, in accordance with various embodiments, the location of each identified keyword appearing in the document can be recorded. This can include the locations of the various keywords that appear in the document and the location of any other term (or character or string) that was recognized in the document. An "order" score can be determined for the candidate websites based at least in part upon the order of the identified keywords. For example, if the original keywords were A, B, C, D, then a candidate website with A, C, D would have a higher relevancy score than A, D, C. In various embodiments, such a result can help to reduce false positives by lowering the relevancy of results where some of the keywords may appear, but in orders different than were present in the image data.

In addition to determining an order score for the candidate websites, the website suggestion component can analyze the candidate websites to attempt to determine the presence of a model number, product identifier, item code, title, authors, appendix, citations, table of contents, or other such string. In at least some embodiments, uncommon words such as model numbers can help identify relevant contextual information. For example, while many websites might include a word such as "liquid," a limited set of websites might have associated strings such as "D234AS-3." While such information can be indicative of a website including relevant contextual information, the uncommonness of these strings can prevent certain websites from being accurately identified by the OCR component in some cases or situations, such that it can be desirable to still utilize other information discussed and suggested herein. In this example, the keywords can be analyzed to attempt to determine whether any of the keywords match a known model number, product identifier, etc. If so, those keywords can be given an up-weighting. Similarly, the keywords can be analyzed to attempt to determine whether any of the keywords match patterns, model numbers, logos, etc. even if those markings are not included in a dictionary of potential keywords. This helps to improve accuracy by increasing the scope of potential model numbers and identifiers that may not be in a fixed dictionary, as introducing a pattern-based model number identification algorithm can help to recover additional model numbers missed by the creators or maintainers of the dictionary. Various patterns can be used for recognition, as may include strings of a range of lengths that may include numbers or specific characters, as well as capital letters or other such inclusions. Various patterns can be generated for matching, whereby strings with certain locations of numbers or letters are more likely identified as model numbers. Further, certain brands might use certain model number patterns, and if a brand name is identified then the associated model number patterns can be given more weight in attempting to locate model numbers from the text. A model score can then be updated based at least in part upon any model number being identified in the text. In some cases each word can have a multiplier of 1 if not a model number and a multiplier of greater than 1 (e.g., 5) if determined to be a model number. In some embodiments the multiplier might be greater (e.g., 5) for a known model number than (e.g., 2) for a string that was not recognized but matches the pattern of a model number. A total relevancy score for a candidate search suggestion can be generated based at least in part upon the index relevancy score, the order score, and the model score. This can be the result of an additive function, such as may be given by:

total relevancy=index relevancy+order score+model score or total relevancy=index relevancy*order score*model score or total relevancy=index relevancy*(order score+model score)

among other such options. In at least some embodiments a machine learning algorithm can be used that can monitor user interaction with the contextual information after the new scores are determined, as well as user actions after obtaining these results. The machine learning algorithm can then learn, over time, which of the above functions (or other related functions) provides the most accurate results and can use that function going forward. Additional monitoring can occur such that the formulas can be updated over time as appropriate. If there are determined to be additional websites to be analyzed, the process can continue with total relevancy scores being generated for those results as well.

The candidate websites can be ranked by total relevancy score to determine a set of websites 218 that include relevant contextual information. The set can include a predetermined number of highest candidate websites, for example. In some embodiments, a candidate website must be associated with at least a minimum relevancy score before being returned as a candidate website. Thereafter, at least one website of the set of websites 218 can be searched using a search engine to obtain contextual information related to the document.

Figure 3:
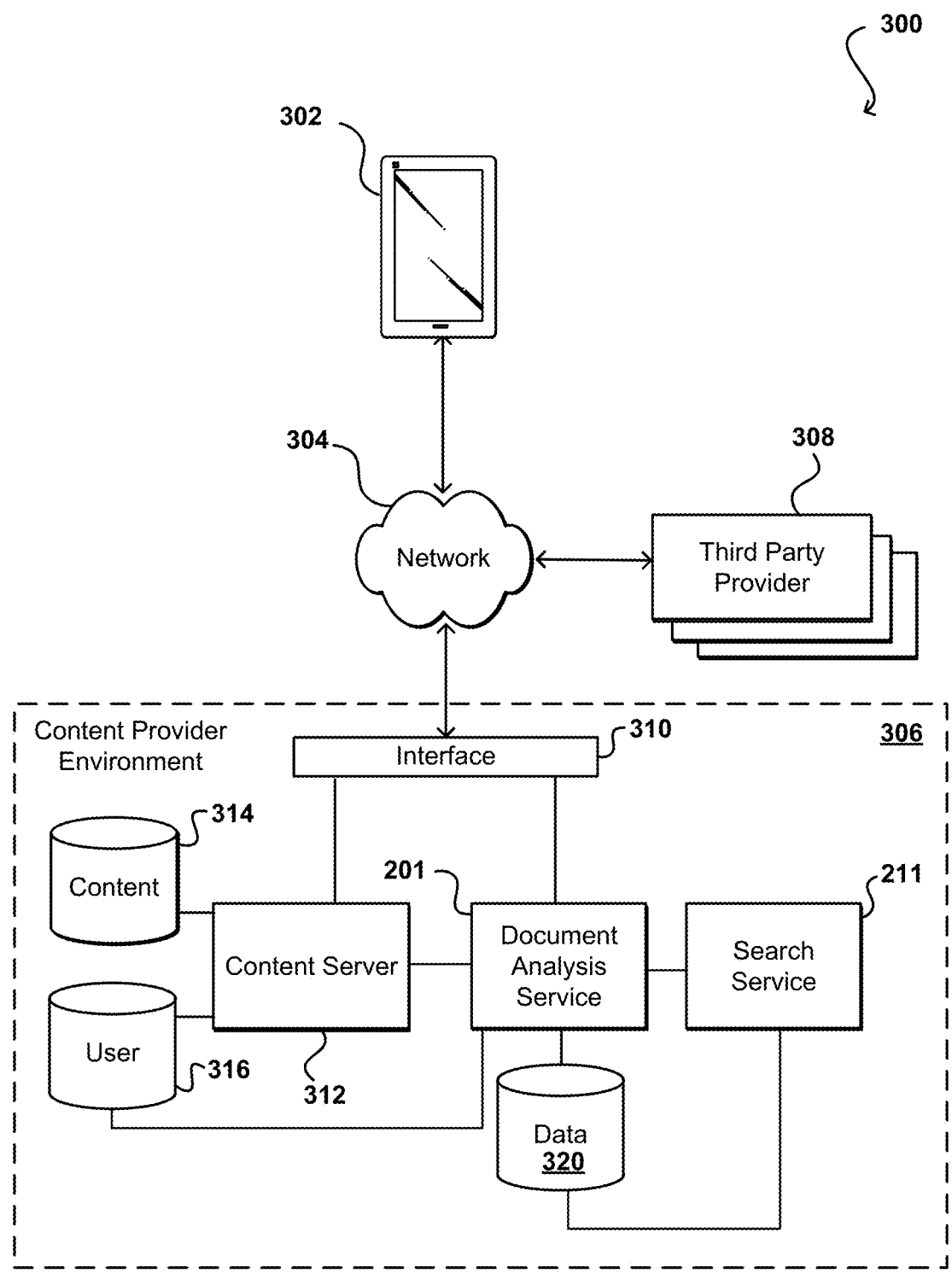
FIG. 3 illustrates an example system for displaying relevant contextual information associated with a document in accordance with various embodiments.

FIG. 3 illustrates an example environment 300 in which various embodiments can be implemented. In this example, a user is able to upload document data to a file storage service using a computing device 302. An application executing on the computing device (or at least in communication with the computing device) can analyze the document data to determine and/or recognize text in the document data. The recognized text can be used to determine a set of keywords, and the set of keywords can be used to determine a set of websites that include contextual information associated with the document data. As the user views the document, the contextual information can be provided for display. For example, the computing device can send a request to process the document data across at least one appropriate network 304, such as may include the Internet, a local area network (LAN), a cellular network, and the like. The request can be sent to an appropriate content provider 306, as may provide one or more services, systems, or applications for processing such requests.

In this example, the request is received to a network interface layer 310 of the content provider 306. The network interface layer can include any appropriate components known or used to receive requests from across a network, such as may include one or more application programming interfaces (APIs) or other such interfaces for receiving such requests. The network interface layer 310 might be owned and operated by the provider, or leveraged by the provider as part of a shared resource or "cloud" offering. The network interface layer can receive and analyze the request, and cause at least a portion of the information in the request to be directed to an appropriate system or service, such as a content server 312 (e.g., a Web server or application server) and a document analysis service 201. As described, the document analysis service 201 can analyze the document data to determine a set of keywords based on features extracted from the document data. The keywords can be used by a search service 201 to determine a set of websites that include contextual information associated with the document data. A search service 211 in this example includes components operable to receive the keywords and submit queries to a search engine to return contextual information that are determined to match the keywords within at least an acceptable amount of deviation, within an allowable matching threshold, etc. For example, the search service 211 can use the keywords to query a data store of websites to return a ranked list of websites. The websites might be indexed and/or processed to facilitate with matching, as is known for such purposes. The index can be stored in data store 320 or other such data store, for example. The list of websites can go through a relevance ranking process in order to determine websites that are most relevant to the text identified from the document data and search terms received in a user search. In at least some embodiments, the relevance function can consider the ordering of the keywords in order to rank websites more highly that contain the keywords in the same order. Further, the relevance function can consider the confidence of the recognition of each keyword, as well as other factors. A search can be received, at least some of the websites can be analyzed using a search engine to obtain a set of search results, such as may be associated with contextual information associated with the document data and search terms. In the case of webpages, for example, the content server 312 might be used to generate code and send content for rendering the requested Web page and/or application data to display search results. The document analysis service 201, search service 211, content server 312 or other services and/or components of the environment might access one or more data stores, such as a user data store 316 that contains information about the various users, and one or more content repositories 314 storing content able to be served to those users.

In at least some embodiments the content to be provided can include data 320 for training classifiers on object categories, words, and descriptions of images, or other such visual characteristics represented in the document data, for example by providing information to the document analysis service 201 or other such component or service, for analyzing the provided information and attempting to generate key words, or other elements as discussed herein. As should be understood, each service and/or component can include one or more computing components, such as at least one server, as well as other components known for providing services, as may include one or more APIs, data storage, and other appropriate hardware and software components. It should be understood that, although the services are shown to be part of the provider environment 306 in FIG. 3, that one or more of these services might be operated by third parties that offer these services to the provider.

Figure 4:
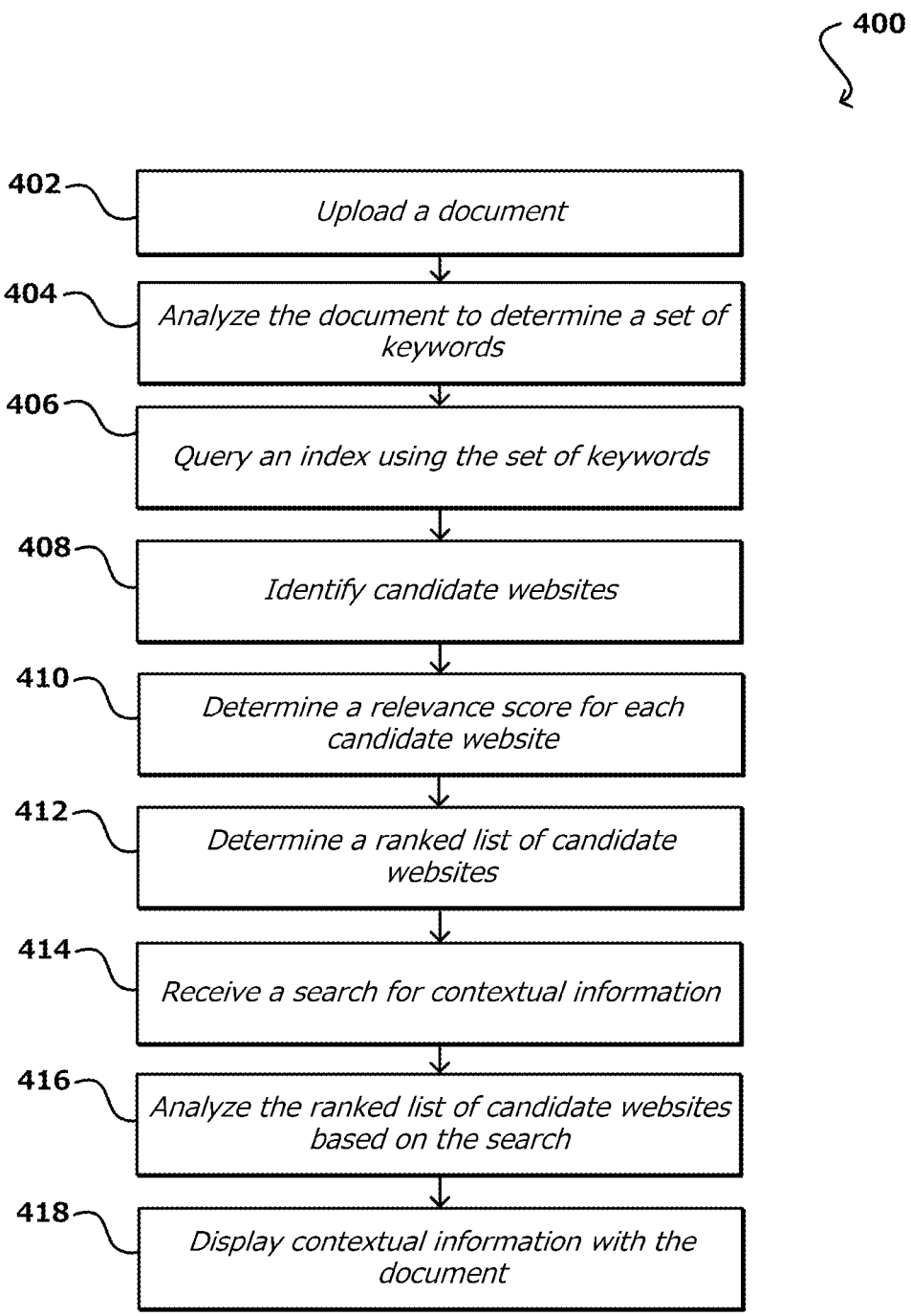
FIG. 4 illustrates an example process for displaying relevant contextual information associated with a document in accordance with various embodiments in accordance with various embodiments.

FIG. 4 illustrates an example process 400 for displaying relevant contextual information associated with a document in accordance with various embodiments. It should be understood that there can be additional, fewer, or alternative steps performed in similar or alternative orders, or in parallel, within the scope of the various embodiments unless otherwise stated. In this example, a document stored locally or remote a user's computing device can be uploaded 402 to a file storage service or other such service. The document can be, for example, a user manual, a product manual, a scholarly paper, a product listing, a financial report, a receipt, an instruction manual, a digital book, etc. An application executing on the computing device (or at least in communication with the computing device) can analyze 404 the document to determine a set of keywords (e.g., words) based on features extracted from the document. The document can be analyzed using different techniques to determine the keywords, such as an optical character recognition (OCR) technique, an object recognition technique, a logo recognition technique, among other such techniques. The keywords can be used to query 406 an index of websites based on a relevance function in order to determine a ranked list of websites that are most relevant to the text identified from the document. The index can include formation from various websites. The websites can include social networks, message boards, forums, blog or personal websites, business websites, ecommerce websites, business directory websites, job board websites, question and answer websites, nonprofit and religion websites, portfolio websites, online community websites, auction websites, knowledgebase/wiki websites, podcasting websites, school or college websites, periodical websites among other such websites. Querying the index using the relevance function can include identifying 408 candidate websites in the index that include a word of the set of words. A relevance score can be determined 410 for each candidate website based on a number of keywords from the set of keywords included in a respective candidate website, a confidence value associated with each of the keywords, an ordering of the keywords in the website, for example. A ranked list of candidate websites can be determined 412 based on respective relevancy scores. A user search for contextual information can be received 414, and at least some of the websites in the ranked list of candidate websites can be analyzed 416 using a search engine to obtain determine contextual information associated with the document. Thereafter, contextual information can be displayed 418 with the document. For example, the contextual information can be displayed in a viewing pane, a pop-up, an overlay, among other such options. Upon receiving, from a user, a touch (or other) selection of the contextual information, additional information for the selected contextual information can be displayed, enabling the user to quickly learn more about content in the document.

Figure 5:
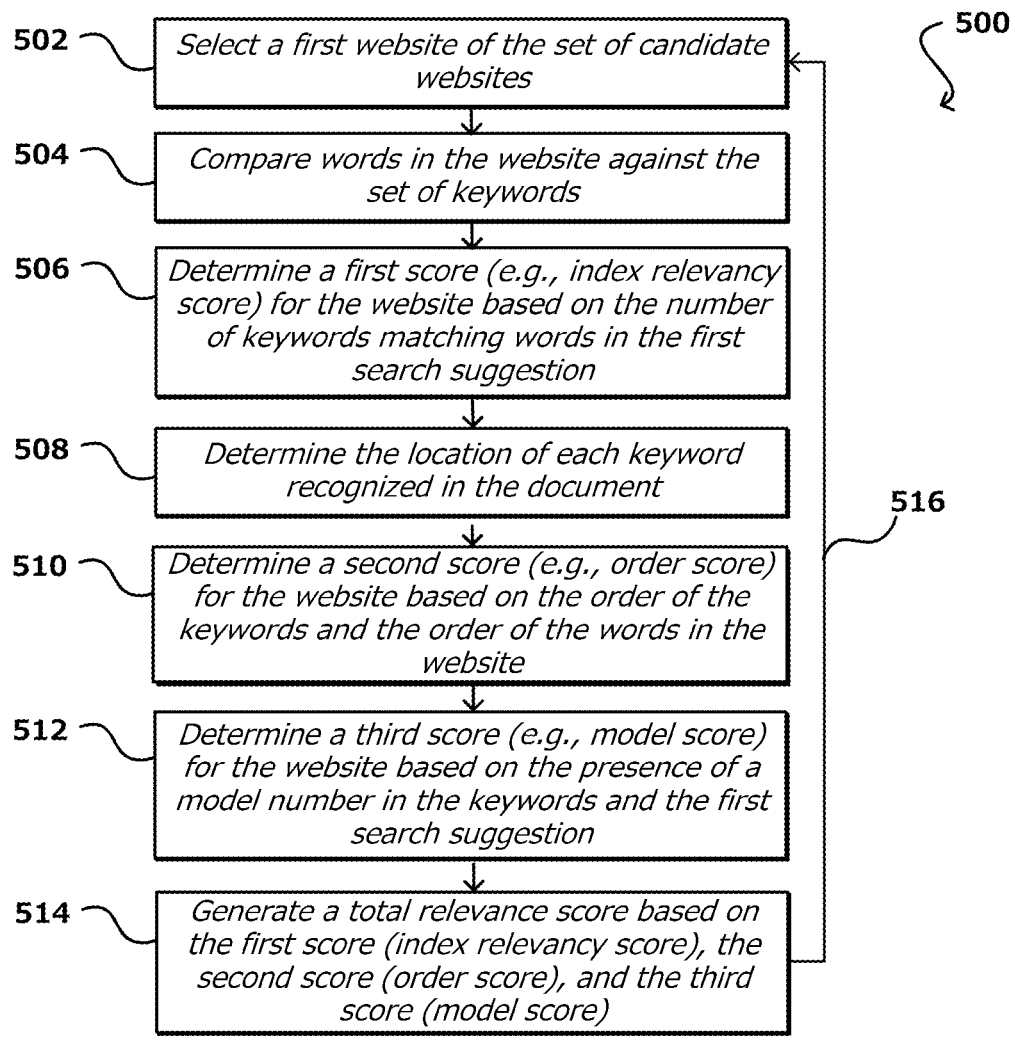
FIG. 5 illustrates an example process for determining a relevance score that can be utilized in ranking websites in accordance with various embodiments.

As described, each website can be associated with a ranking or scoring indicating the relevance of a particular website. FIG. 5 illustrates once such example process 500 for determining a relevance score in accordance with various embodiments. In this example, starting with selecting 502 a first website of the set of candidate websites, keywords and metadata in the website can be compared 504 against all the keywords in the set of keywords recognized from the document. A first score for the website can be determined 506 based on a number of keywords matching words in the website. In addition to considering all the recognized keywords, the relative ordering of the keywords can be considered as well. In this example, the location of each recognized word appearing in document can be determined 508. This includes not only the locations of the various keywords, but also the location of any other word (or character or string) that was recognized from in the document. A second score (e.g., "order" score) can be determined 510 for the website based on the order of the keywords in the document and the order of the words in the website. For example, if the keywords were A, B, C, D, then a candidate website with A, C, D would have a higher relevancy score than A, D, C. Such a result can help to reduce false positives by lowering the relevancy of results where some of the keywords may appear, but in orders different than were present in the document. In addition to determining a first score and a second score (e.g., order score) for the website, the website can be analyzed to attempt to determine 512 a third score based on the presence of a model number, product identifier, item code, or other such string in the keywords and the website. In this example, the keywords can be analyzed to attempt to determine whether any of the keywords match a known model number or product identifier. If so, those keywords can be given a substantial up-weighting. Similarly, the keywords can be analyzed to attempt to determine whether any of the keywords match patterns for model numbers or identifiers, even if those numbers or identifiers may not be include in the relevant dictionary or data store of words. Further, certain brands might use certain model number patterns, and if a brand name is identified then the associated model number patterns can be given more weight in attempting to locate model numbers from the text. A total relevancy score for the website can be generated 514 based at least in part upon the first score (e.g., the index relevancy score), the second score (e.g. order score), and the third score (e.g., model score.) The process can be repeated 516 for each website in the set of websites to determine a ranked list of candidate websites.

Figure 6:
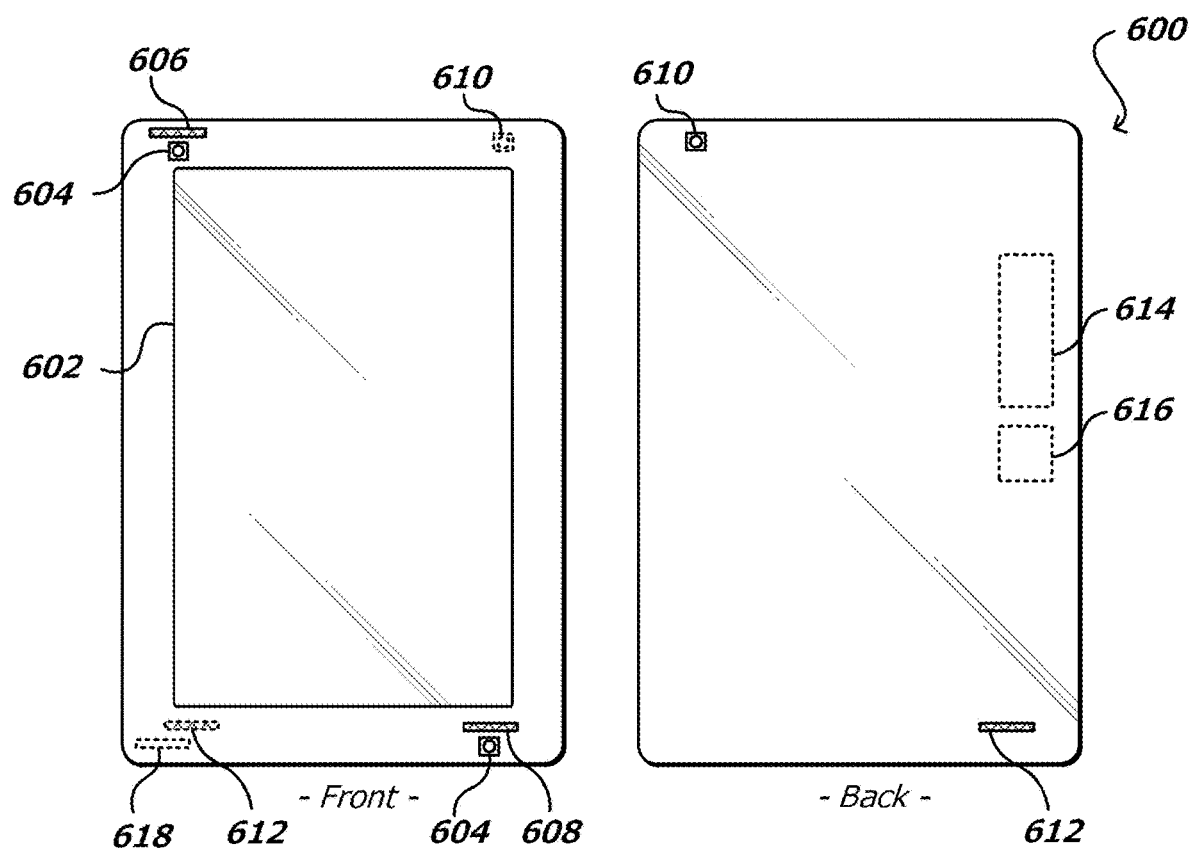
FIG. 6 illustrates an example computing device that can be used in accordance with various embodiments.

FIG. 6 illustrates front and back views of an example electronic computing device 600 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, notebook computers, electronic book readers, personal data assistants, cellular phones, video gaming consoles or controllers, television set top boxes, and portable media players, among others.

In this example, the computing device 600 has a display screen 602 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements 604 on the front of the device and at least one image capture element 610 on the back of the device. It should be understood, however, that image capture elements could also, or alternatively, be placed on the sides or corners of the device, and that there can be any appropriate number of capture elements of similar or different types. Each image capture element 604 and 610 may be, for example, a camera, a charge-coupled device (CCD), a motion detection sensor or an infrared sensor, or other image capturing technology.

As discussed, the device can use the images (e.g., still or video) captured from the imaging elements 604 and 610 to generate a three-dimensional simulation of the surrounding environment (e.g., a virtual reality of the surrounding environment for display on the display screen of the device). Further, the device can utilize outputs from at least one of the image capture elements 604 and 610 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 608 on the front side, one microphone 612 on the back, and one microphone 606 on or near a top or side of the device. In some devices there may be only one microphone, while in other devices there might be at least one microphone on each side and/or corner of the device, or in other appropriate locations.

The device 600 in this example also includes one or more orientation- or position-determining elements 618 operable to provide information such as a position, direction, motion, or orientation of the device. These elements can include, for example, accelerometers, inertial sensors, electronic gyroscopes, and electronic compasses.

The example device also includes at least one communication mechanism 614, such as may include at least one wired or wireless component operable to communicate with one or more electronic devices. The device also includes a power system 616, such as may include a battery operable to be recharged through conventional plug-in approaches, or through other approaches such as capacitive charging through proximity with a power mat or other such device. Various other elements and/or combinations are possible as well within the scope of various embodiments.

Figure 7:
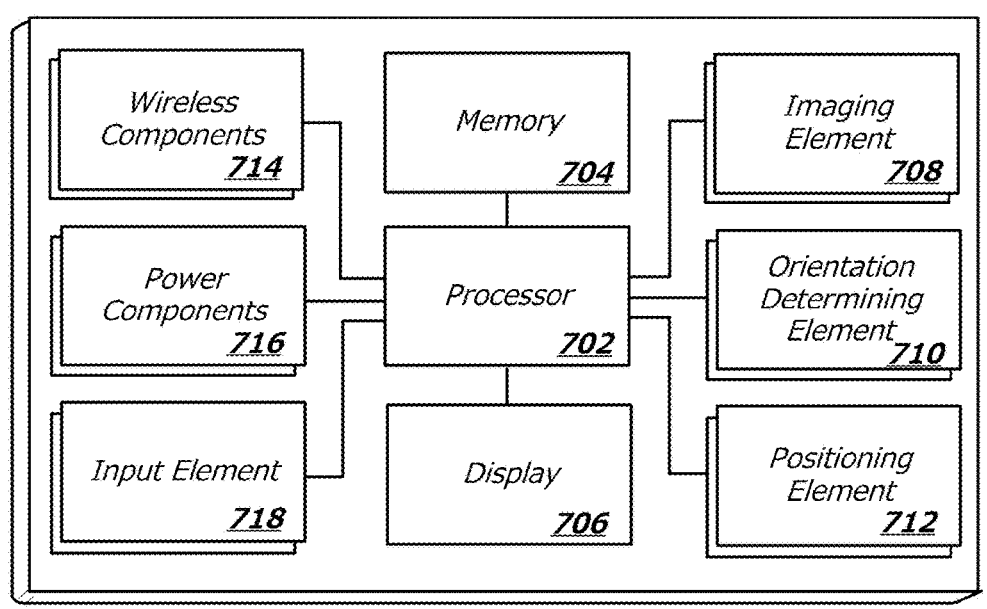
FIG. 7 illustrates example components of a computing device such as that illustrated in FIG. 6.

FIG. 7 illustrates a set of basic components of an electronic computing device 700 such as the device 600 described with respect to FIG. 6. In this example, the device includes at least one processing unit 702 for executing instructions that can be stored in a memory device or element 704. As would be apparent to one of ordinary skill in the art, the device can include many types of memory, data storage, or computer-readable media, such as a first data storage for program instructions for execution by the processing unit(s) 702, the same or separate storage can be used for images or data, a removable memory can be available for sharing information with other devices, and any number of communication approaches can be available for sharing with other devices.

The device typically will include some type of display screen 706, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 708, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 700 also includes at least one orientation determining element 710 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 700. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 712 for determining a location of the device (or the user of the device). A positioning element can include or comprise a GPS or similar location-determining elements operable to determine relative coordinates for a position of the device. As mentioned above, positioning elements may include wireless access points, base stations, etc., that may either broadcast location information or enable triangulation of signals to determine the location of the device. Other positioning elements may include QR codes, barcodes, RFID tags, NFC tags, etc., that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 714 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 716, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 718 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

Figure 8:
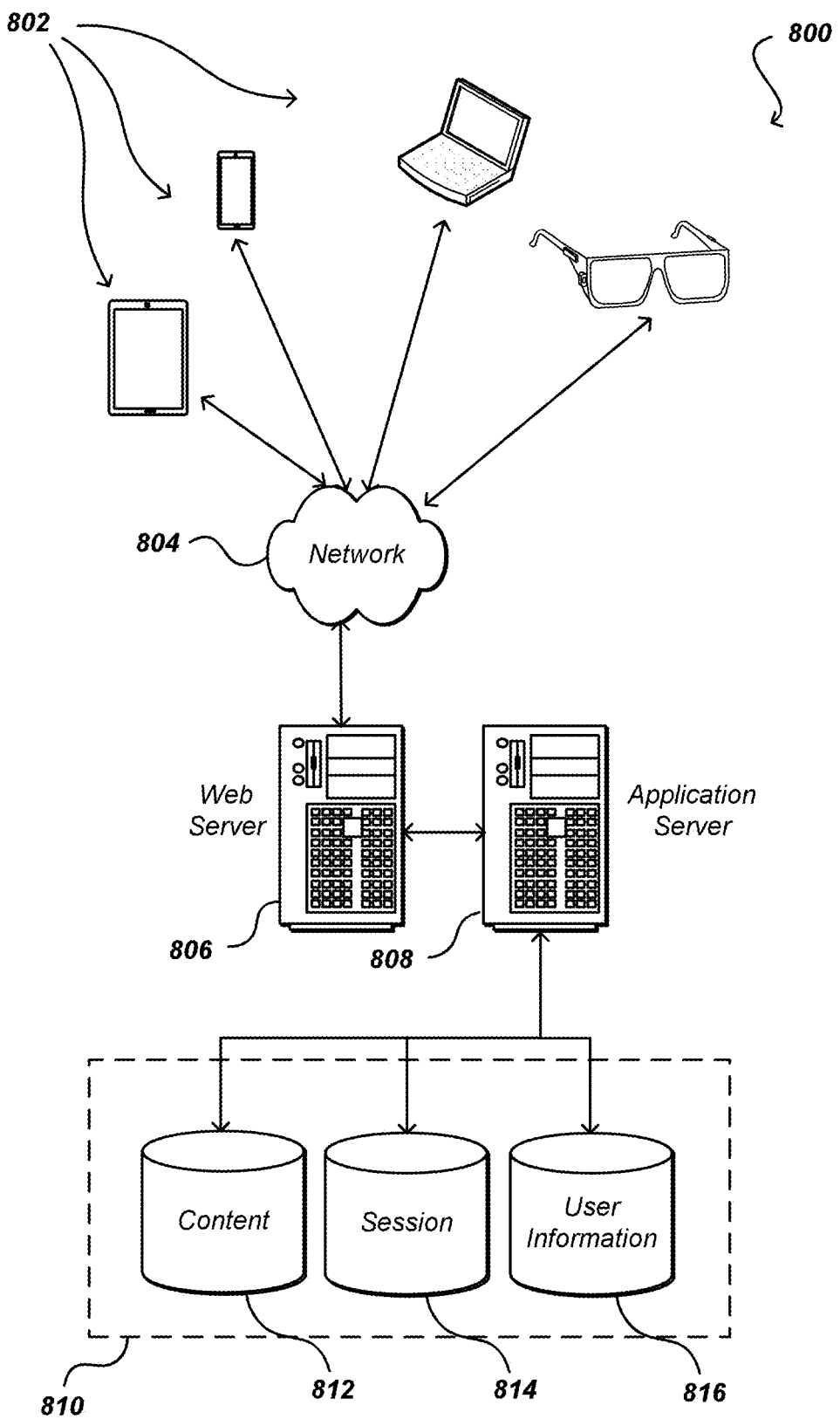
FIG. 8 illustrates an environment in which various embodiments can be implemented.

As discussed, different approaches can be implemented in various environments in accordance with the described embodiments. For example, FIG. 8 illustrates an example of an environment 800 for implementing aspects in accordance with various embodiments. As will be appreciated, although a Web-based environment is used for purposes of explanation, different environments may be used, as appropriate, to implement various embodiments. The system includes electronic client devices 802, which can include any appropriate device operable to send and receive requests, messages or information over an appropriate network 804 and convey information back to a user of the device. Examples of such client devices include personal computers, cell phones, handheld messaging devices, laptop computers, set-top boxes, personal data assistants, electronic book readers, surveillance cameras, cameras on vehicles, helmets and glasses, and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 806 for receiving requests and serving content in response thereto, although for other networks, an alternative device serving a similar purpose could be used, as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 808 can include any appropriate hardware and software for integrating with the data store 810 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 806 in the form of HTML, XML or another appropriate structured language in this example. The handling of all requests and responses, as well as the delivery of content between the client devices 802 and the application server 808, can be handled by the Web server 806. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing content (e.g., production data) 812 and user information 816, which can be used to serve content for the production side. The data store is also shown to include a mechanism for storing log or session data 814. It should be understood that there can be other information that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on anyone of the user devices 802. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C # or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display screen or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device, comprising:
a computing device processor;
a memory device including instructions that, when executed by the computing device processor, cause the computing device to:
receive a document that includes content, the document stored on a computing resource and associated with a user account;
analyze the document to determine a plurality of relevant portions of the content;
display the document on an interface of a display screen of a computing device, the interface including a search field and the content of the document;
receive a query from the search field that includes a search term;
query an index that includes contextual information using the search term;
determine relevant contextual information associated with the search term based at least in part on the search term and at least one weight factor, wherein the at least one weight factor is based at least in part on a first relevance score determined based on the plurality of relevant portions of the document and a second relevance score determined based on the index;
display, on a first area on the interface, a portion of the content of the document associated with the search term; and display with the portion of the content in a second area of the interface, the relevant contextual information associated with the search term.

2. The computing device of claim 1, wherein the instructions, when executed further enable the computing device to:
use optical character recognition (OCR) techniques on the document to determine a first set of keywords represented in the document;
use object recognition techniques on the document to determine a second set of keywords corresponding to characteristics of an object represented in the document;
use logo recognition techniques on the document to determine a third set of keywords corresponding to one of a logo or brand represented in document; and
use bar code recognition techniques on the document to identify a bar code, wherein the plurality of relevant portions is based at least in part on the first set of keywords, the second set of keywords, the third set of keywords, and the bar code.

3. The computing device of claim 2, wherein the instructions, when executed further enable the computing device to:
analyze a plurality of websites to determine respective keywords associated with each of the plurality of websites;
index information associated with the plurality of web sites and respective keywords;
associate the first set of keywords, the second set of keywords, the third set of keywords, and the barcode with the information associated with the plurality of websites and respective keywords to the relevant contextual information.

4. A computing system, comprising:
a computing device processor;
a memory device including instructions that, when executed by the computing device processor, cause the computing system to:
obtain a document stored on a computing resource and associated with a user account;
analyze the document to identify a relevant portion of the document;
determine contextual information by querying an index using at least some of the relevant portion of the document based at least in part on at least one weight factor, wherein the at least one weight factor is based at least in part on a first relevance score determined based on the relevant portion of the document and a second relevance score determined based on the index;
receive a user input pertaining to the relevant portion of the document;
responsive to the user input, display, on a first area of an interface that includes at least a portion of the document; and
display, on a second area of the interface, one of a graphical element that indicates contextual information associated with the document or contextual information associated with the document.

5. The computing system of claim 4, wherein the document includes at least one of a user manual, a product manual, a scholarly paper, a product listing, a financial report, a receipt, an instruction manual, or a digital book.

6. The computing system of claim 4, wherein the instructions, when executed further enable the computing system to:
use optical character recognition (OCR) techniques and object recognition techniques to determine a set of keywords associated with the document; and
associate the set of keywords with the contextual information stored in the database.

7. The computing system of claim 4, wherein the user input includes a search query, and wherein the instructions, when executed further enable the computing system to:
display, on the first area on the interface, a portion of the document associated with a search term of the search query; and
display with the portion of the document in the second area of the interface, contextual information associated with the search term.

8. The computing system of claim 4, wherein the user input includes scrolling the document from a first viewable area of the document to a second viewable area of the document, and wherein the instructions, when executed to provide information further enable the computing system to:
display updated contextual information based at least in part on the second viewable area of the document being displayed.

9. The computing system of claim 4, wherein the user input includes one of opening a document from an online document storage system, updating a display area of the document, or searching content in the document.

10. The computing system of claim 4, wherein the instructions, when executed further enable the computing system to:
emphasize relevant portions of the document associated with contextual information, wherein emphasizing the relevant portions of the document includes applying a text effect to the relevant portions of the document or displaying a graphical element proximate to the relevant portions of the document.

11. The computing system of claim 4, wherein the instructions, when executed further enable the computing system to:
provide a display of a mapping between the relevant portion of the document and respective contextual information.

12. The computing system of claim 4, wherein the instructions, when executed to provide information further enable the computing system to:
display the contextual information in one of an overlay on the document, a side panel proximate the document, a pop-up window, or in a web browser within the interface.

13. The computing system of claim 4, wherein the instructions, when executed further enable the computing system to:
analyze a plurality of web pages to determine contextual information associated with user uploaded documents; and
index the contextual information, wherein the web pages includes social media pages, electronic message boards, or electronic user generated content.

14. The computing system of claim 4, wherein the instructions, when executed further enable the computing system to:
enable controls to control a type of contextual information displayed and controls to customize a view of the contextual information, wherein customizing the view of the contextual information includes one of changing a layout of the contextual information, minimizing or maximizing a view of the contextual information, or stacking the contextual information.

15. The computing system of claim 4, wherein the instructions, when executed further enable the computing system to:

enable a search engine with the document, wherein the search engine is operable to receive a search query for contextual information associated with the document.

16. A method, comprising:

obtaining a document stored on a computing resource and associated with a user account;

analyzing the document to identify a relevant portion of the document;

determining contextual information by querying an index using at least some of the relevant portion of the document based at least in part on at least one weight factor, wherein the at least one weight factor is based at least in part on a first relevance score determined based on the relevant portion of the document and a second relevance score determined based on the index;

receiving a user input pertaining to the relevant portion of the document;

responsive to the user input, displaying, on a first area of an interface that includes at least a portion of the document; and displaying, on a second area of the interface, the contextual information.

17. The method of claim 16, further including:

using optical character recognition (OCR) techniques and object recognition techniques to determine a set of keywords associated with the document; and associating the set of keywords with the contextual information stored in the database.

18. The method of claim 16, wherein the user input includes a search query, the method further including:

displaying, on the first area on the interface, a portion of the document associated with a search term of a search query; and displaying with the portion of the document in the second area of the interface, contextual information associated with the search term.

19. The method of claim 16, further comprising:

emphasizing relevant portions of the document associated with contextual information, wherein emphasizing the relevant portions of the document includes applying a text effect to the relevant portions of the document or displaying a graphical element proximate to the relevant portions of the document.

20. The method of claim 16, further comprising:

determine a change in a viewing area of the interface; and update a display of contextual information based on the change in the viewing area.

* * * * *